United States Patent
Stone (12) United States Patent (10) Patent No.: US 7,958,053 B2
Stone (45) Date of Patent: Jun. 7, 2011

(54) METHOD AND SYSTEM FOR EXTENDING CREDIT WITH AUTOMATED REPAYMENT

(75) Inventor: Brian Stone, Alpharetta, GA (US)

(73) Assignee: CompuCredit Intellectual Property Holdings Corp. II, Las Vegas, NV (US)

( * ) Notice: Subject to any disclaimer, the term of this patent is extended or adjusted under 35 U.S.C. 154(b) by 1278 days.

(21) Appl. No.: 11/415,645

(22) Filed: May 2, 2006

(65) Prior Publication Data

US 2007/0260537 A1 Nov. 8, 2007

(51) Int. Cl.
*G06Q 40/00* (2006.01)
*G07F 19/00* (2006.01)

(52) U.S. Cl. .......................................... 705/45; 235/379

(58) Field of Classification Search ............... 705/35–42
See application file for complete search history.

(56) References Cited

U.S. PATENT DOCUMENTS

| | | | | |
|---|---|---|---|---|
| 5,206,803 A * | 4/1993 | Vitagliano et al. | .......... | 705/36 R |
| 5,870,721 A * | 2/1999 | Norris | .............................. | 705/38 |
| 5,910,988 A * | 6/1999 | Ballard | .......................... | 705/75 |
| 6,032,137 A * | 2/2000 | Ballard | .......................... | 705/75 |
| 6,105,007 A * | 8/2000 | Norris | .............................. | 705/38 |
| 7,197,173 B2 * | 3/2007 | Jones et al. | .................... | 382/135 |
| 7,392,935 B2 * | 7/2008 | Byrne et al. | .................... | 235/379 |
| 7,440,924 B2 * | 10/2008 | Buchanan et al. | ............. | 705/45 |
| 7,594,600 B2 * | 9/2009 | Mueller et al. | ................. | 235/375 |
| 7,660,771 B2 * | 2/2010 | Orcutt | .............................. | 705/64 |
| 7,792,717 B1 * | 9/2010 | Hankins et al. | ................. | 705/35 |
| 7,802,717 B2 * | 9/2010 | Mueller et al. | ................. | 235/375 |
| 2002/0052852 A1 * | 5/2002 | Bozeman | .......................... | 705/64 |
| 2002/0111886 A1 * | 8/2002 | Chenevich et al. | ............. | 705/30 |
| 2002/0184152 A1 * | 12/2002 | Martin | ............................. | 705/45 |
| 2004/0111370 A1 | 6/2004 | Saylors et al. | | |
| 2005/0038737 A1 | 2/2005 | Norris | | |
| 2005/0071283 A1 * | 3/2005 | Randle et al. | .................... | 705/75 |
| 2005/0096986 A1 * | 5/2005 | Taylor et al. | .................... | 705/16 |
| 2005/0097046 A1 * | 5/2005 | Singfield | ......................... | 705/42 |
| 2005/0171798 A1 * | 8/2005 | Croft et al. | ......................... | 705/1 |
| 2006/0053290 A1 * | 3/2006 | Randle et al. | ................. | 713/169 |
| 2006/0106717 A1 * | 5/2006 | Randle et al. | ................... | 705/45 |

(Continued)

OTHER PUBLICATIONS

"Digital Insight Expands Strategic Partnership with BankServ to Bring Remote Deposit Image Capture to Business Banking Clients; Digital Insight Expands Market Potential of Business Banking Solutions with Product Designed to Give Financial Institutions Competitive Advantage", PR Newswire. New York: Apr. 10, 2006.*

(Continued)

*Primary Examiner* — Ella Colbert
*Assistant Examiner* — Mohammad Z Shaikh
(74) *Attorney, Agent, or Firm* — Chason A. Carroll; Philip H. Burrus, IV (57) ABSTRACT

A system and method for extending a firm offer of credit contingent upon receiving a one-time authorization to execute recurring automatic withdrawals from a deposit account is provided. In providing the one-time authorization to execute recurring automatic withdrawals, a prospective borrower may elect from a plurality of automatic withdrawal repayment options. One such option is electronic fund transfer, such as the initiation of a withdrawal entry into the Automated Clearing House network. A second option is by the remote creation of a paper negotiable instrument, which is then converted into an electronic substitute check capable of electronic routing. Upon receiving the one-time authorization, the lender may make recurring automatic withdrawals from the borrower's deposit account.

18 Claims, 6 Drawing Sheets

U.S. PATENT DOCUMENTS

| | | | |
|---|---|---|---|
| 2006/0242062 A1* | 10/2006 | Peterson et al. | 705/42 |
| 2007/0076940 A1* | 4/2007 | Goodall et al. | 382/137 |
| 2007/0083461 A1* | 4/2007 | Andalib et al. | 705/38 |
| 2007/0086642 A1* | 4/2007 | Foth et al. | 382/137 |
| 2007/0124241 A1* | 5/2007 | Newton | 705/39 |

OTHER PUBLICATIONS

The Client Business Case for Remote Deposit Capture: Detailed analysis provides compelling insights.*

"BankServ Partners with the Bancorp Bank to Provide Private Label Banking and OFDI Processing to their customers", Business Wire. New York: Nov. 15, 2004. p. 1.*

Valentine, Lisa, "Remote Deposit Capture Hot Just got hotter", American Bankers Association. ABA Banking Journal. New York: Mar. 2006. vol. 98, Iss. 3; p. 30, 6 pgs.*

"Infonox Launches ActiveKiosk(™) Suite", PR Newswire, p. NA, Oct. 18, 2005.*

Schneider, I., "Banks launch remote deposit capture", Bank Systems & Technology, vol. 42, No. 5, pp. 14.*

Murphy, Patricia, "Deposit gathering Goes Remote", US Banker, p. 12, 15-16, 2006.*

Leekley, John, "Business Method Patents in Financial Services: A new toll booth on the Remote Deposit Capture superhighway?", © 2005 Blue Mountain Enterprises, LLC. pp. 1-2.*

"Check Image Archives Boost Bank's Need for Digital Storage"; Optical Memory News, n. 241, p. N/A, Jul. 15, 1997.*

"Check Scanning ATMs Gaining Ground. (automated teller machines), American Banker, v171, n49, p. 3A, Mar. 14, 2006"L.*

LaSalle Bank Corporate Clients Processing Check Deposits Electronically, PR Newswire, p. NA, Oct. 12, 2005.*

"BankServ Partners with the Bancorp Bank to Provide Private Label Banking and OFDI Processing to their customers", Business Wire. New York: Nov. 15, 2004. p. 1.* http://money.howstuffworks.com/credit-card.htm.

http://www.nacha.org/About/what_is_ach_.htm.

15 USC 1693(k).

12 CFR 205.10.

Check 21 Resource Document, Mar. 2004.

PCT Search Report, "Search Report and Written Opinion, Form PCT/ISA/220", PCT/US2007/060756, International Filing Date Sep. 5, 2007, Mailed Mar. 18, 2010.

* cited by examiner

◀▶ http://www.creditapplication.com/applynow.html — 401    402    306

Credit  Apply to receive an unsecured credit card

Guaranteed $300 Unsecured Credit Line! Apply Today!

Click to Increase Credit

Credit
555 123 456
Your Name Here

Applicant Information:

First Name          Middle Initial          Last Name                                403

Address             City                    State                    Zip

Home Phone                                  E-mail address

Months at Residence:    404
Choose ▾

Social Security Number    Date of Birth        Mother's Maiden Name

Work Phone               Annual Income:

How do you receive your income?              How often do you receive your income?
Choose ▾                                      Choose ▾                               304

Your banking information is required for making minimum payments on your Guaranteed $300 Unsecured Gold Credit Card Credit Line.

type your ABA or Routing Number and Checking Account Number. Use picture as a guide.

405
ABA or Routing Number:

Checking Account Number:

Your Name                              1525
15 Your Street
Your town, GA 12345
Pay to the
Order of _____________________ Dollars Memo _______________
123456789   98765432   1525
ABA or Routing   Account   Check
Number           Number    Number       406

Automatic Payment Information:

Credit Unsecured Credit Card takes the worry out of paying your monthly credit card bill. Enrollment in the Credit Unsecured Credit Card Automatic Payment Plan is required for account approval. CLICK HERE to see additional information regarding the automatic payment amount. PLEASE INDICATE HOW YOU WOULD LIKE TO MAKE YOUR AUTOMATIC PAYMENTS BY SELECTING ONE OF THE OPTIONS BELOW:    407

● By selecting the EFT option, you elect to have your payments made by electronic funds transfer ("EFT"). An EFT is a convenient, paperless electronic transfer of funds from your checking account.    408

● By selecting the RCC option, you elect to have your payments made by remote check creation ("RCC") and authorize the bank to create paper drafts on your behalf to withdraw funds from your checking account. *You understand that by selecting this RCC option, you are choosing to pay higher account fees to cover the additional costs of handling and processing RCC payments.*

I would like to choose:  Choose ▾
                                         409
410      Details of Offer and Applicant Statement
            Ts & Cs You are applying for a Guaranteed $300 Unsecured Credt Card Credit Line, and by clicking the "Apply Now" button below, you agree to the "Details of Offer" and the "Applicant Statement" presented above.    411

APPLY NOW!

METHOD AND SYSTEM FOR EXTENDING CREDIT WITH AUTOMATED REPAYMENT

BACKGROUND

1. Technical Field

This invention relates generally to a system and method for providing credit to be paid by automated withdrawals from a deposit account, and more particularly to a system and method for extending credit, wherein the credit extension is contingent upon receiving a one-time authorization to execute multiple, automatic withdrawals from a deposit account.

2. Background Art

With the advent of technology, transactions involving an exchange of money are becoming faster and faster. Not too long ago, the process of paying the telephone bill was time consuming and involved a lot of paper. For instance, a person might first receive a physical paycheck from his employer. He would then physically go to the bank, to deposit the paycheck in his checking account. Once the physical paycheck proceeded through the check clearing system, the funds would be credited to the person's account. With the funds securely in his checking account, the person would then physically write a check to the telephone company and mail it. The telephone company would then physically go to the bank, deposit the check and so forth. The entire process may take ten days or more to complete.

The problems with this conventional, paper-based system are numerous. First, the process takes too long. A customer may write a check and have difficulty balancing his checking account due to the lengthy time required for the check to clear. Second, the customer must remember to physically write a check each and every month, less services be terminated. Third, the process of physically carrying a paper check from customer to bank to bank to service provider to customer is costly.

There is thus a need for an improved method and system for obtaining payments from customers.

BRIEF DESCRIPTION OF THE DRAWINGS

The accompanying figures, where like reference numerals refer to identical or functionally similar elements throughout the separate views, serve to further illustrate various embodiments and to explain various principles and advantages all in accordance with the present invention.

FIG. 4 illustrates an exemplary webpage for extending an offer of credit in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to a system and method for extending credit, wherein the extension of credit is contingent upon receiving a one-time authorization to execute multiple electronic fund transfers from a deposit account. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of either extending an offer of credit that is contingent upon receiving a one-time authorization to execute multiple electronic fund transfers from a deposit account, or the repayment of credit by multiple electronic fund transfers permitted by a one-time authorization as described herein. As such, these functions may be interpreted as steps of a method to perform such an extension or collection of credit. Further, it is expected that one of ordinary skill, notwithstanding possibly significant effort and many design choices motivated by, for example, available time, current technology, and economic considerations, when guided by the concepts and principles disclosed herein will be readily capable of generating such software instructions, modules, and programs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." In this document, relational terms such as first and second, top and bottom, and the like may be used solely to distinguish one entity or action from another entity or action without necessarily requiring or implying any actual such relationship or order between such entities or actions.

Embodiments of the invention as described herein enable an extension of credit where repayments are to be made with the execution of multiple, recurring, automatic fund withdrawals authorized by a one-time consent. The method facilitates the recurring withdrawals while staying in compliance with the 15 USC §1693k, which states, "No person may condition the extension of credit to a consumer on such consumer's repayment by means of preauthorized electronic fund transfers . . . " The invention provides a method and system where multiple methods of payment are allowed, thereby providing the customer a choice between payment types such as electronic fund transfers and other payment types. The payments are "automatic" in that they occur without the borrower having to initiate the transaction. In other words, the withdrawals are "pulled" by the lender per the one-time consent, as opposed to being pushed by lender action, such as writing a check each month.

In accordance with the invention, a firm offer of credit is extended to a customer. The firm offer of credit is contingent upon receiving a one-time authorization to execute multiple automatic withdrawals from a deposit account. In one embodiment, the multiple automatic withdrawals may take one of two forms. A first mode of repayment is by electronic fund transfer, for example by initiating a debit in the Automated Clearing House network. A second mode of repayment is by a remotely generated paper negotiable instrument, for example by using a remote check creation process. In the remote check creation process, a check is printed without the borrower's signature, and is then scanned, thereby creating a substitute check that may be routed electronically. The customer may elect from these options.

For example, a person may desire to receive a line of credit to make merchandise purchases. This person may receive a $500 line of credit, to be deposited into his checking account in accordance with the invention. In exchange for receiving the line of credit, the person provides a one-time consent for payments to be made automatically from the checking account, perhaps $105 a month for five months to cover principal and interest. Depending upon the mode of payment selected, the lender, from the one-time consent, would then execute remote automatic withdrawals from the checking account on a monthly basis until the outstanding balance was repaid. The invention allows the lender to reduce collection costs, while saving the borrower the time, effort, and expense of having to physically write and mail checks to the lender.

In another example, a lender may extend a debit or credit card offer to a borrower. The card may include a purchasing limit equivalent to the amount of credit extended to the borrower. In such a scenario, rather than the lender depositing the funds into a checking account, the lender issues the credit card so that the borrower may use it for spending until the credit line is exhausted. During any month in which a balance is outstanding on the card, the lender may execute automatic withdrawals from the lender's checking account to cover repayment of principal and interest.

Figure 1:
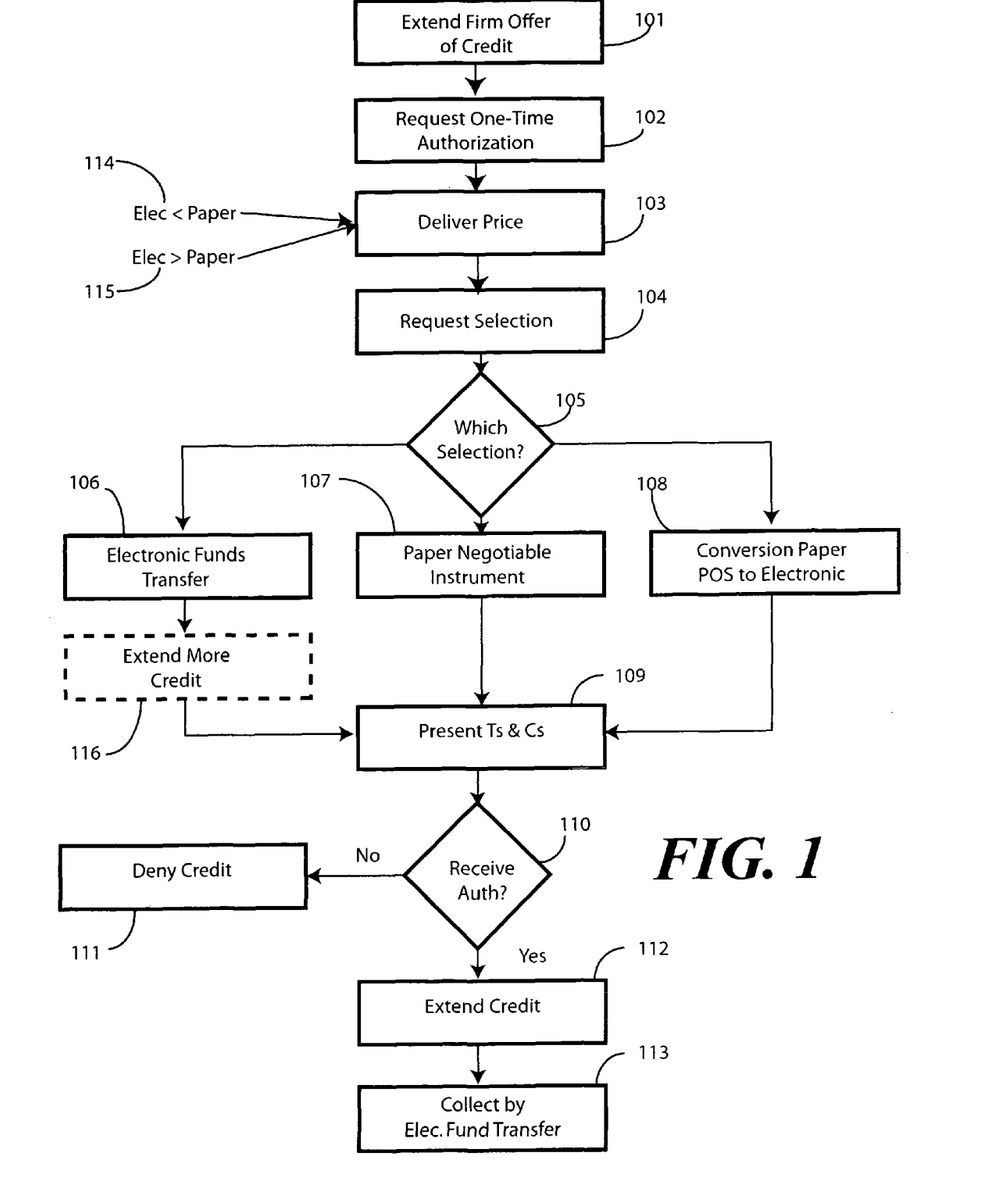
FIG. 1 illustrates a method of offering credit in accordance with the invention.

Turning now to FIG. 1, illustrated therein is one embodiment of a method for an extension of credit and receipt of a one-time authorization to execute multiple automatic withdrawals in accordance with the invention. At step 101, a firm offer of credit is extended from a lender. The firm offer of credit is contingent upon obtaining a one-time authorization to execute recurring automatic withdrawals from a deposit account, which is requested at step 102.

By way of example, a lender may extend an offer, through a retail lending store, customer representative, or website, for a temporary credit line of $1000 to a borrower. The credit line funds are to be provided to the borrower by delivering to the borrower a credit card having a preset spending limit in the amount of $1000. To obtain the $1000, the borrower provides a one-time authorization for the lender to collect payments of principal and interest by executing recurring automatic withdrawals at predetermined times from his checking account.

In one embodiment of the invention, a customer may select how the recurring automatic withdrawals are to be made. For example, one form of automatic withdrawal is by way of initiating a withdrawal entry from the deposit account in an Automated Clearing House Network. The Automated Clearing House Network is a batch-oriented, electronic funds transfer system that is governed by the National Automated Clearing House Association (NACHA) operating rules. These rules set forth an interbank electronic payment and clearing system for participating depository financial institutions. The Federal Reserve Bank and others, like the Electronic Payments Network for instance, serve as Automated Clearing House operators. These operators serve as central clearing facilities through which participating institutions may transmit and receive Automated Clearing House entries. The various forms of Automated Clearing House transactions include direct deposit transactions, consumer bill transactions, business-to-business transactions, and government transactions.

Any individual, corporation, or other entity that initiates an entry into the Automated Clearing House network, be it a deposit (credit) entry or a withdrawal (debit) entry, is considered to be an originator. Any participating financial institution that originates Automated Clearing House entries at the request of a customer is considered to be an originating depository financial institution. Any participating financial institution that is qualified to receive Automated Clearing House entries is considered to be a receiving depository financial institution. Any individual, corporation, or other entity that authorizes an originator to initiate a credit or debit entry to a transaction account that is held in the custody of a receiving depository financial institution is considered to be a receiver.

Thus, in one embodiment of the invention the recurring automatic withdrawal may be executed by initiating a withdrawal entry into the Automated Clearing House network. Continuing with the example from above, where the credit line is $1000 as provided by a spending limit on a credit card, and a balance of $700 is outstanding, and minimum monthly payments of $105 are to be made, the lender may initiate a withdrawal entry into the Automated Clearing House network from the checking account each month until the balance is repaid. As such, a receiving depository financial institution holds the deposit account, as the checking account is held in custody by the lender's bank. The borrower, providing the one-time authorization for the lender to execute the recurring Automated Clearing House transactions, becomes the receiver. The lender, who executes the recurring Automated Clearing House transactions, is the originator. Depending upon the entity, the lender may be the originating depository financial institution and the originator. Otherwise, the lender may have an originating depository financial institution execute the withdrawal entry on its behalf.

Figure 5:
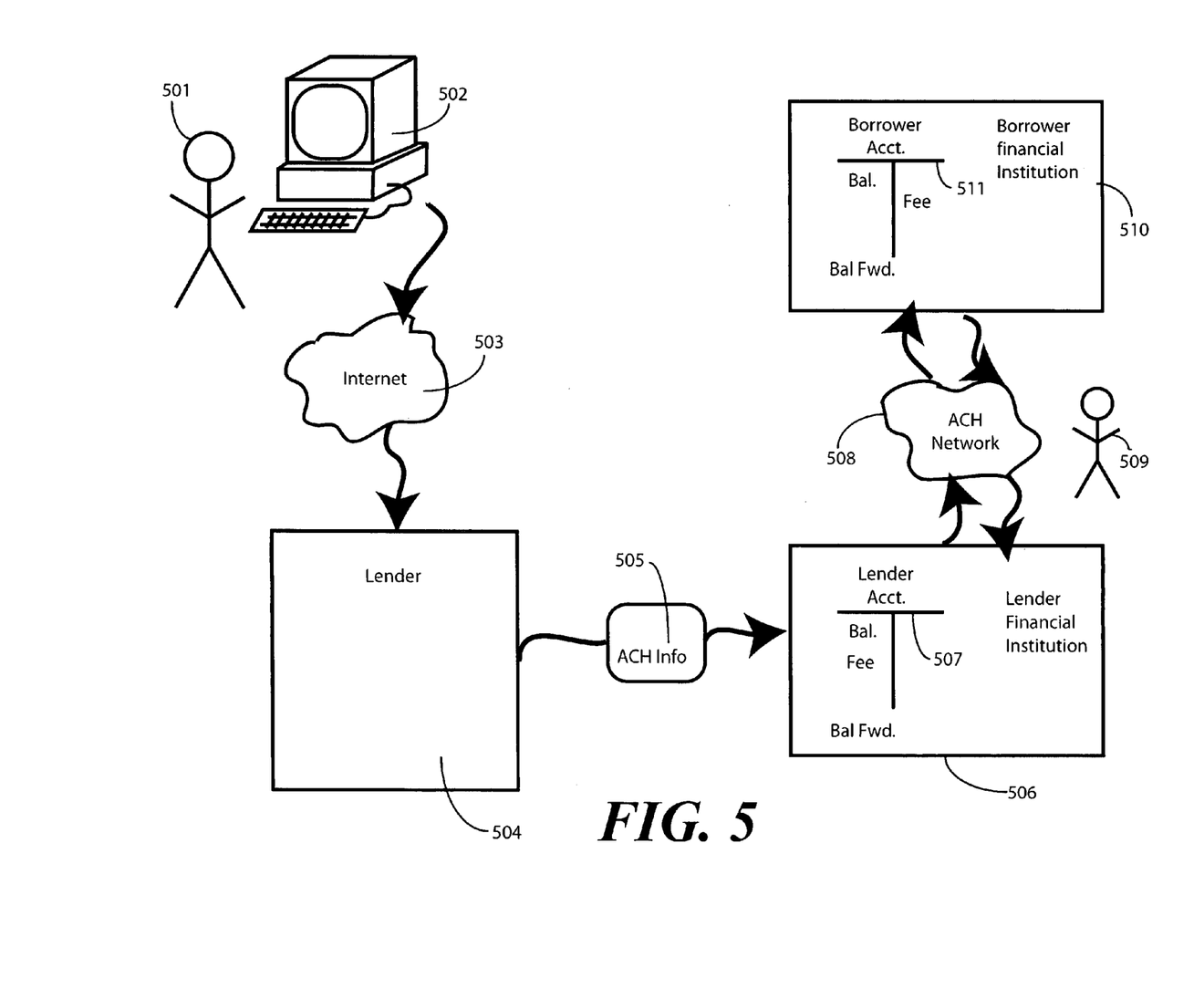
FIG. 5 illustrates an electronic fund transfer in accordance with the invention.

Turning briefly to FIG. 5, illustrated therein is an outline of a Automated Clearing House Transaction. A borrower 501, perhaps by way of a computer 502 coupled to the lender 504 by a network like the Internet 503, sends the Automated Clearing House payment information and an authorization to the lender 504. The lender then submits this information 505 to its bank or other financial institution 506. The bank 506 then routes the transaction to the Automated Clearing House Network 508 and to an Automated Clearing House operator 509. The Automated Clearing House operator 509 then routes the transaction to the borrower's bank 510, which is the receiving financial institution. Funds are made available to the lender, and the borrower's deposit account 511 is debited. The Automated Clearing House operator 509 settles the transactions between the participating financial institutions 506, 510. Final settlement occurs when the lender's account 507 is credited and a confirmation is sent to the lender.

Turning back to FIG. 1, in one embodiment of the invention where the customer may select how the recurring automatic withdrawals are to be made, a second option is by creation and execution of a paper negotiable instrument. As noted above, one such example of the creation and execution of a paper negotiable instrument is a remote check creation process. In a remote check creation, the borrower provides a bank account number and a routing number. The lender then, remotely, creates a paper check with the bank account number, routing number, and amount printed thereon. While this remotely created check may then be circulated through the banking system, thereby making the remote check creation a paper process, more often a hybrid process is used. In the paper/electronic hybrid process, the lender creates a "substitute check" under the Check Clearing for the 21st Century Act, and routes the substitute check electronically to execute the withdrawal from the borrower's checking account.

Figure 6:
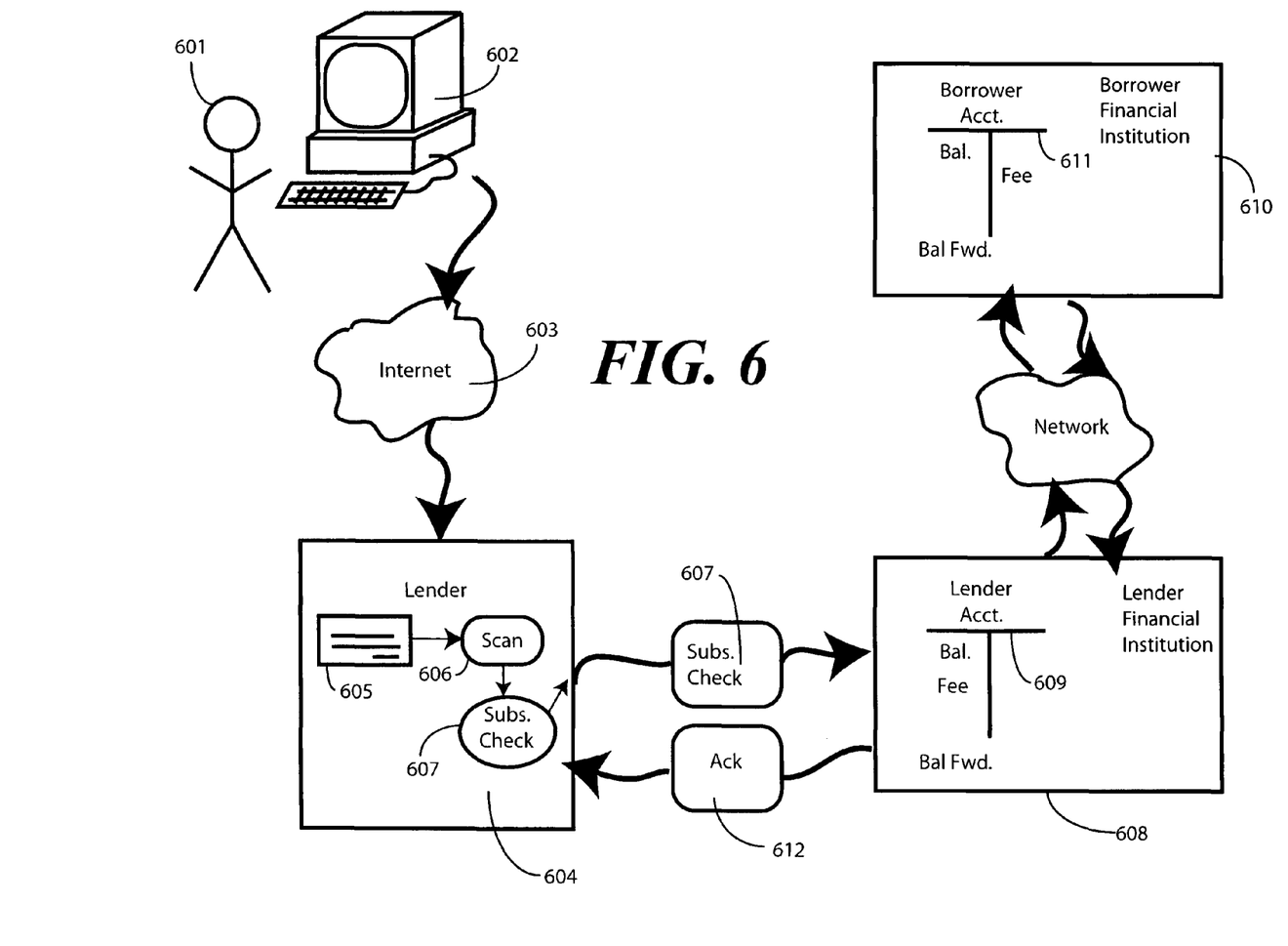
FIG. 6 illustrates a remote check creation process in accordance with the invention.

Turning briefly to FIG. 6, illustrated therein is an outline of a hybrid remote check creation process. A borrower 601, perhaps by way of a computer 602 coupled to the lender 604 by a network like the Internet 603, sends an account number and routing number to the lender 604. The lender 604 then remotely creates a paper check 605, having a MICR line just as would a personal check written and signed by the borrower 601. The paper check 605 is then scanned 606 and converted into a "substitute check" 607 in accordance with the Check Clearing for the 21 st Century Act. This substitute check 607 is then transmitted electronically to the lender's bank 608 for deposit. The lender's bank 608 preliminarily credits the lender's account 609 and electronically routes the substitute check 607 to the borrower's bank 610. The borrower's bank 610 then debits the borrower account 611 and completes the routing of the substitute check 607. A confirmation 612 is then delivered to the lender 604.

It will be clear to those of ordinary skill in the art having the benefit of this disclosure that the recurring automatic withdrawals of the present invention are not limited to only withdrawal entries in an Automated Clearing House network and remote check creation processes. Other transfer mechanisms may also suffice. For instance, Visa® has recently announced an electronic fund transfer mechanism know as the Visa® POS check service. Similar to remote check creation, the Visa® POS check service converts actual checks tendered at a point of sale into electronic transactions. Thus, in one embodiment of the invention, one option for executing the remote automatic withdrawals is by converting a paper check at a point of sale into an electronic debit. Other electronic techniques may be substituted as well.

Turning now back to FIG. 1, of the options mentioned, generally speaking the withdrawal entry into the Automated Clearing House network is the most cost effective. According to the US Treasury Department, an electronic fund transfer like those through the Automated Clearing House network is less expensive than paper check payments and collections. According to Treasury Department data, it costs the U.S. government eighty-three cents to issue a paper check, while it costs only eight cents to make a payment by way of the Automated Clearing House network.

For this and other reasons, a lender extending an offer of credit in accordance with the invention may elect to price the various automatic withdrawal options differently. Thus, at optional step 103, the price associated with each particular option is presented to the customer. The offer of credit to be paid by recurring automatic withdrawals executed by electronic funds transfers, like the withdrawal entry into the Automated Clearing House network, may be offered at a first price, while the offer of credit to be paid by recurring automatic withdrawals executed by other mechanisms, such as remote creation of paper negotiable instruments, may be offered at a second price. Where the lender wants, for example, to encourage customers to select the electronic fund transfer option, the price associated with such transfers may be less than those for remote creation of paper negotiable instruments as is shown at 114. The opposite may also be true: the electronic fund transfer option may be offered at a higher price than the creation of paper negotiable instruments, as is shown at 115. The borrower's selection from the various options is requested at step 104.

Decision 105 determines which of the options the borrower has selected. Continuing with the discussion of the previous paragraphs, exemplary options include an electronic funds transfer 106, one example of which is a withdrawal entry into the Automated Clearing House network; creation of a paper negotiable instrument 107, one example of which is remotely creating a check and converting into a substitute check for electronic delivery; and conversion of a paper check at a point of sale into an electronic debit 108.

As noted above, the cost of the electronic funds transfer may be less than other repayment mechanisms. Thus, it may be desirous for the lender to encourage the borrower to select the electronic funds transfer option 106. One option for doing so, the option of offering this option to the borrower at a lower transaction cost, was set forth above. Another option is to extend additional credit to the borrower where the electronic funds transfer option 106 is selected. This is shown as optional step 116. By way of example, where the borrower qualifies normally for a $1000 line of credit, the lender may agree to extend $1100 of credit where the electronic funds transfer option 106 is selected.

Once the selection is made, a lender may elect to present terms and conditions to the borrower at step 109. The terms and conditions may include the frequency of the automatic withdrawals, the timing of the automatic withdrawals, and the amount of principal and interest to be repaid. Further, the terms and conditions may include language required by regulation, such as a reiteration that the borrower is giving a one-time consent for recurring automatic withdrawals from their deposit account, or that the election of the electronic funds transfer is not a requirement of the extension of credit in accordance with 15 USC §1693k.

At decision 110, receipt of the one-time authorization to execute recurring automatic withdrawals from the deposit account is verified. As in one embodiment the firm offer of credit is contingent upon such an authorization, where the one-time authorization to execute recurring automatic withdrawals from the deposit account is not received, credit is denied at step 111.

Where the one-time authorization to execute recurring automatic withdrawals from the deposit account is received, the lender extends the line of credit at step 112. Where the deposit account is configured to receive direct deposit transactions, the lender may execute an electronic funds transfer to deposit the credit amount into the deposit account. Alternatively, where the lender is issuing a credit card to the borrower, the lender may deliver the card with the associated preset spending limit to the borrower. The lender may then collect repayments by executing recurring automatic withdrawals from the deposit account at step 113.

Figure 2:
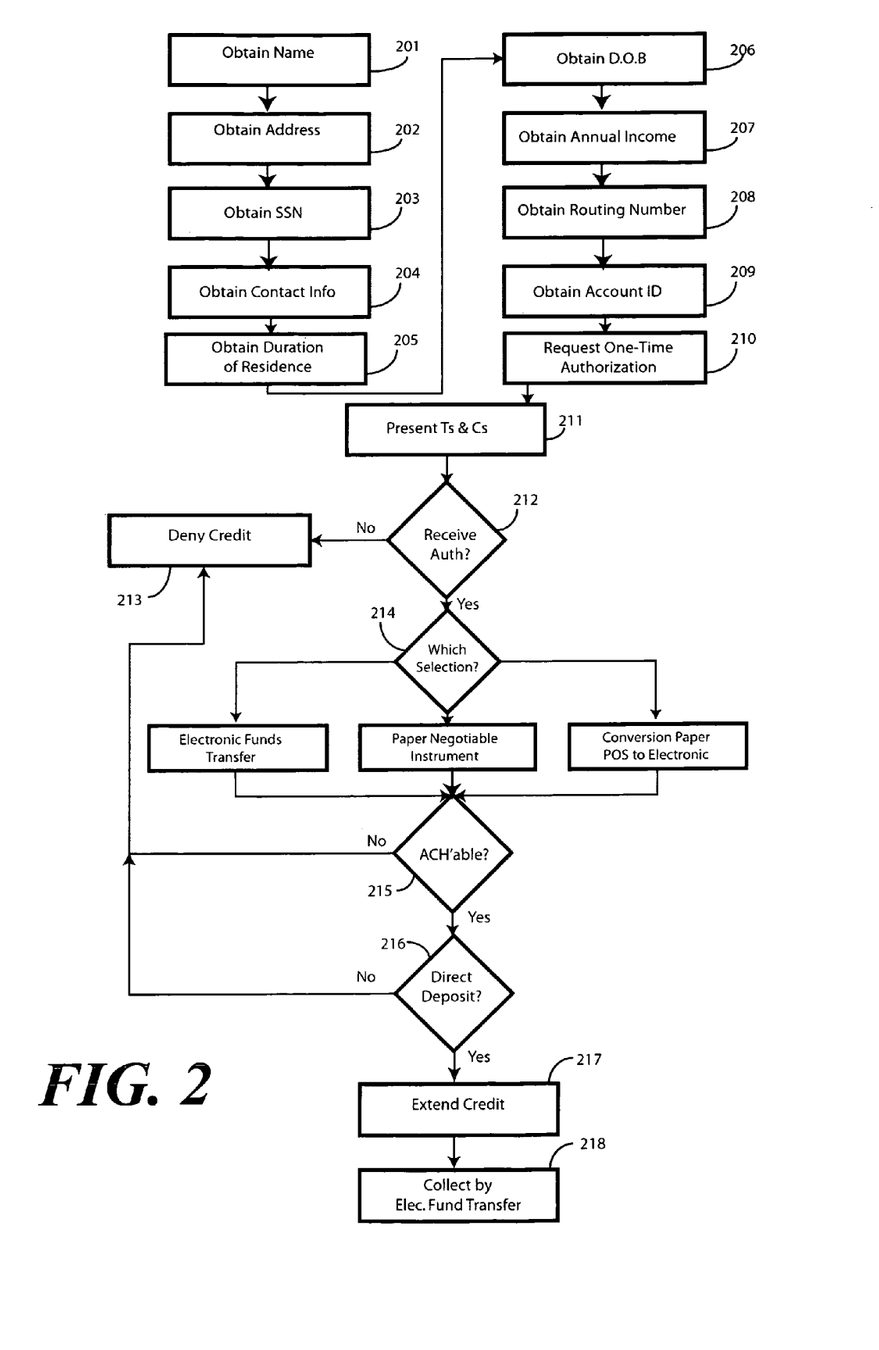
FIG. 2 illustrates an alternate method of offering credit in accordance with the invention.

Turning now to FIG. 2, illustrated therein is an alternative method for extending credit in accordance with the invention. As noted above, one suitable channel for offering such a line of credit is through a lender website, to which the borrower may connect with a computer or terminal having browser software. Once connected to the website, the borrower may provide certain personal and financial information with which the lender may determine the borrower's credit worthiness. The method of FIG. 2 is illustrative of one method suitable for use in conjunction with website offer and acceptance of credit in accordance with the invention.

At step 201, the lender obtains the borrower's name. At step 202, the lender obtains the borrower's address. At step 203, the lender obtains a borrower identification number. One such number is a Social Security Number, with which the lender may obtain borrower credit reports, credit scores and other credit worthiness information.

At step 204, the lender obtains the borrower's contact information. This contact information may include a telephone number, an e-mail address, a facsimile number, or other information. In addition to the borrower identification number, the lender may desire to have other information for determining credit worthiness. For example, the lender may desire to know the borrower's duration of residence, which is optionally obtained at step 205. The lender may also obtain the borrower's date of birth at step 206 for identity verification. The lender may obtain the borrower's annual income at step 207.

So that recurring automatic withdrawals may be used for the repayment of the line of credit, the lender may need to obtain an American Banker's Association (ABA) routing number at step 208. To know from which account the withdrawals should be made, the lender may obtain the account number of the borrower's deposit account at step 209.

At step 210, as with the method of FIG. 1, the lender requests a one-time authorization to execute recurring automatic withdrawals from the deposit account. In one embodiment of the invention, the extension of credit is contingent upon receiving such an authorization. Also as with FIG. 1, in one embodiment, the one-time authorization may include a borrower selection from a plurality of repayment options, including remote electronic funds transfer and remote check creation. In one embodiment, at least one of the plurality of options is a withdrawal executed by remote electronic funds transfer. Such a transfer may be effected by originating a withdrawal entry into the Automated Clearing House network. In another embodiment, at least one of the plurality of options is a remote check creation process.

At step 211, which may be concurrent with the request for one-time authorization at step 210, the lender may present terms and conditions associated with the extension of credit to the borrower. In one embodiment, the terms and conditions include a notification that an automatic deduction from the deposit account in an amount at least equal to a minimum payment will occur during any month in which a balance is carried, thereby reiterating to the borrower that automatic withdrawals will occur as long as credit is extended. The terms and conditions may further include a notice that authorization of the withdrawals executed by electronic funds transfer from the deposit account is not a requirement for continuation of the credit line. One exemplary embodiment of such terms and conditions is set forth here:

Terms and Conditions:
Details of Offer and Applicant Statement
By clicking the "Apply Now" button below, you authorize [lender] to (i) immediately deduct the one-time processing fee from your checking account if you are approved for a [line of credit] and (ii) automatically deduct your minimum payment(s) from your checking account each month that you carry a balance and initiate such payments by EFT when directed to do so. You understand and agree that (iii) the automatic deduction will take place on the payment due date each month on the dates you have previously selected or on the $1^{st}$ and $15^{th}$ of each month; (iv) unless you direct Customer Service otherwise, the amount deducted will be one-half of your minimum payment for that statement cycle; (v) your [line of credit] privileges are contingent upon your maintaining and properly handling both your checking account and your [line of credit] and may terminate immediately upon the termination or closing of either account for any reason; and (vi) you authorize us to make periodic reviews of your accounts and withdraw any [line of credit] card privileges previously granted to you. You understand that we may choose to close your [line of credit] if your participation in the [line of credit] Automatic Payment Plan is terminated at any time. Finally, you acknowledge that selection of the EFT Option for automatic payments is not a requirement of continuing credit under your account.

By clicking the "Apply Now" button below, you understand that you are applying for a [line of credit] under the "Summary of Terms" and "Terms of Offer" disclosed. You authorize us to obtain credit reports on you from the consumer reporting agencies for any legal purpose, including evaluation of your application and subsequently in connection with any update, extension of credit review, or collection of your account. If you request, you will be informed whether any credit report was requested, and if so, the name and address of the consumer reporting agency furnishing this report. You further agree that if your application is not approved for your [line of credit], you may receive an electronic notice stating the reason(s) for our decision.

At decision 212, the lender checks to see whether the one-time authorization to execute recurring automatic withdrawals from the deposit account has been received. In the embodiment where the offer for credit is contingent upon receipt of the one-time authorization, and the one-time authorization is not received, the lender may deny credit, as is shown at step 213.

Where the authorization is received, the lender may determine which of the options for recurring automatic withdrawals the borrower has selected at decision 214. As noted above, these options include, but are not limited to, an electronic funds transfer by way of an withdrawal entry into the Automated Clearing House network; remote creation of a paper negotiable instrument, such as a check, which may be converted into a substitute check and routed electronically; and conversion of a paper check into a substitute check for electronic routing.

To ensure that the lender will be able to collect repayments by electronic transfer, where the option selected is withdrawal through the Automated Clearing House network, at decision 215 the lender may determine whether the deposit account belonging to the borrower is configured to receive withdrawal entries by way of the Automated Clearing House network. This may be done in a variety of ways. One exemplary method is to determine whether the financial institution having custody of the deposit account is a receiving depository financial institution.

A second exemplary method is to initiate a withdrawal entry into the Automated Clearing House network for an account creation fee or other service charge. Once the funds are received from such a transaction, the lender has verified that the deposit account is configured to receive such transactions. Other methods for determining whether the deposit account is configured to receive transactions from the Automated Clearing House network will be obvious to those of ordinary skill in the art having the benefit of this disclosure. Where the borrower selects electronic transfer through the Automated Clearing House network, and the deposit account is not configured to receive such transactions, the lender may elect to deny credit at step 213.

As various credit offers have differing terms and conditions, it is possible that certain extensions of credit to certain customers will include a requirement that the deposit account from which the recurring automatic withdrawals will be drawn be configured to receive direct deposits, perhaps from the borrower's employer. Where this is the case, the lender may determine whether the account is configured to receive direct deposits at decision 216. This may be done in a variety of ways. One exemplary method is by the lender depositing a small amount into the deposit account, such as five cents. When the deposit clears and the nickel appears in the deposit account, the lender understands that the deposit account is configured to receive direct deposits.

A second exemplary method is by monitoring the account for deposit activity. Where the lender sees regular, periodic deposits being made electronically, perhaps from an employer, the lender knows that the deposit account is configured to receive direct deposits. Where direct deposit compatibility is a requirement for credit, and the account is determined not to be compatible with direct deposit transactions at decision 216, the lender may deny credit at step 213.

Once the necessary requirements have been met, including in one embodiment receiving a one-time authorization for recurring automatic withdrawals, receiving a selection from a plurality of recurring automatic withdrawal repayment options, and determining that the deposit account is configured to receive such automatic withdrawals, the lender may approve the extension of credit and transfer monies to the borrower, or issue a credit or debit card, at step 217. In one embodiment of the invention, the approval of credit will only occur where each of these is true.

At step 218, the lender may begin collecting repayment installments by executing at least one automatic withdrawal from the deposit account. For example, where the borrower selected automatic withdrawals from a checking account by way of the Automated Clearing House network, the borrower may enter a withdrawal entry into the Automated Clearing House network for a minimum payment of principal and interest. The lender need not get a separate authorization for each automatic withdrawal as a one-time authorization was received at decision 212.

Figure 3:
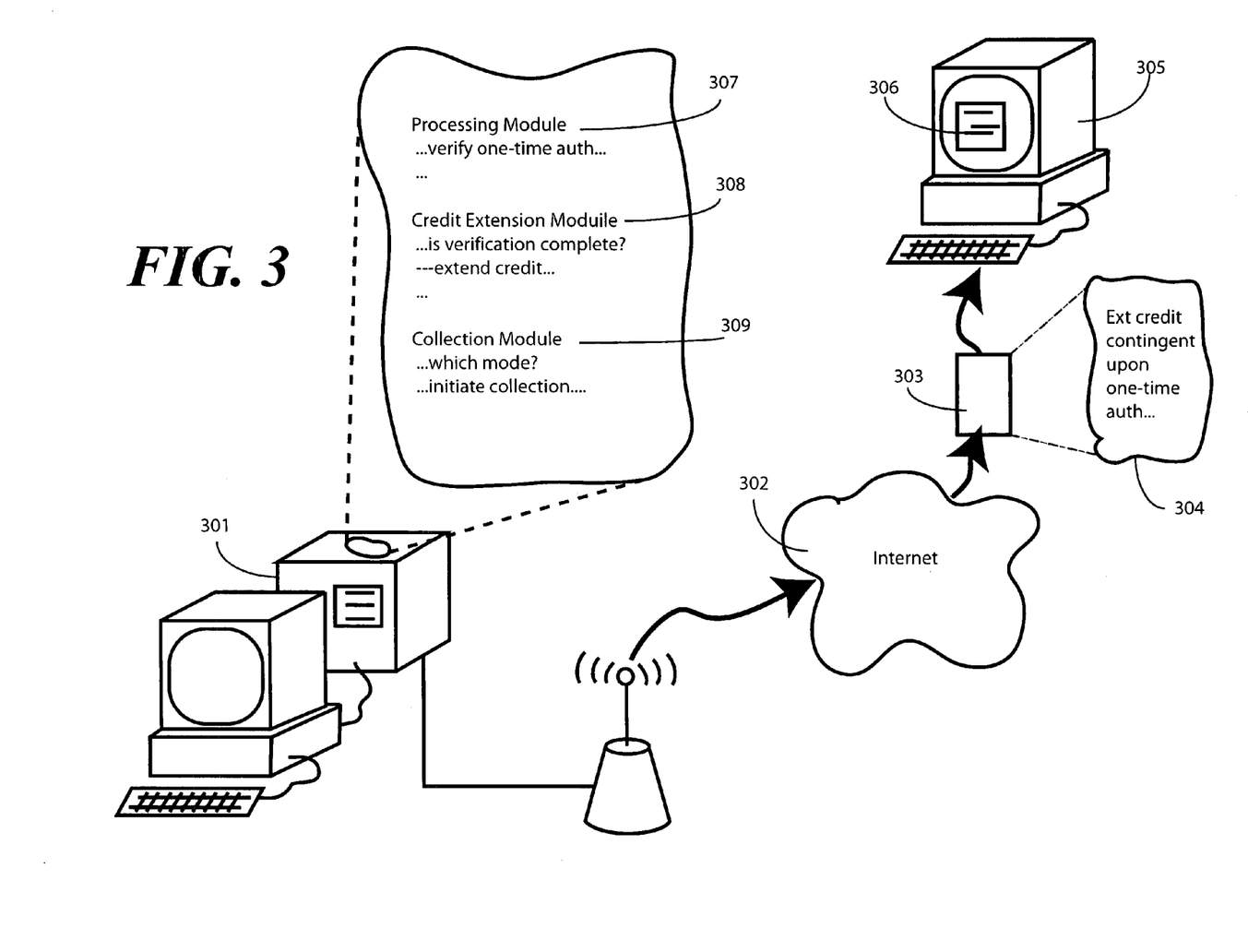
FIG. 3 illustrates a system for extending an offer of credit in accordance with the invention.

Turning now to FIG. 3, illustrated therein is one embodiment of a system for extending credit in accordance with the invention. As noted above, the methods of FIGS. 1 and 2, and the multiple embodiments thereof, may be executed in a variety of ways. The lender may have a customer service representative answering incoming telephone calls from borrowers. Alternatively, the lender may have kiosks or store front retail operations where such credit may be extended. With the advent and increasing popularity of on-line commerce, one channel particularly well suited for methods in accordance with the invention is via a lender website across the internet. Such a system is illustrated in FIG. 3.

A network information server 301 is configured to deliver browser readable content 303 to a client terminal 305 having a browser 306 in communication with the Internet 302. The network information server 301 includes interactive web pages that facilitate a firm offer for an extension of credit, where the offer is contingent upon a borrower providing a one-time authorization for the lender to execute recurring automatic withdrawals from a deposit account by selecting from a plurality of recurring repayment options. In one embodiment, one of the repayment options is an electronic funds transfer. The interactive web pages may include extension of credit application content 304 that requests information from a prospective borrower. The extension of credit application content 304 may further set forth the details of the credit extension offer.

A prospective borrower may access the extension of credit application content 304 through the client terminal 305 by connecting to the Internet 302 and entering a Uniform Resource Locator (URL) address. The borrower may then enter the necessary information, which may include name, address, social security number, bank account number, ABA routing number, and so forth, thereby completing the extension of credit application. The prospective borrower may then select from the plurality of automatic withdrawal payment options, one of which may be by way of electronic funds transfer.

A processing module 307 is operable with the network information server 301 and is configured to verify that the necessary requirements for approving the extension of credit have been met. The processing module 307 may be a software module configured to operate within the network information server 301. Alternatively, the processing module may be software code running on a complimentary system in conjunction with the network information server 301.

Where the offer of credit is contingent upon receiving a one-time authorization for the lender to execute recurring automatic withdrawals, the prospective borrower may provide such authorization by electronic signature. The processing module 307 may then be configured to verify that the authorization to execute recurring automatic withdrawals from the borrower's deposit account is received in conjunction with a completed extension of credit application. In such a contingent scenario, where the processing module 307 determines that such authorization is not received, the offer of credit may be denied.

A credit extension module 308 is configured to authorize the extension of credit once the necessary lender requirements have been satisfied. For example, in the scenario from the preceding paragraph where the offer of credit is contingent upon receiving a one-time authorization for the lender to execute recurring automatic withdrawals, the credit extension module 308 may cause funds to be electronically transferred to the deposit account of the borrower only where the processing module 307 verifies that at least the authorization to execute recurring automatic withdrawals from the deposit account is received. The credit extension module 308, which like the processing module may be software instructions capable of execution on a processor, may effect the transfer of funds in a variety of ways. Just as the automatic withdrawal repayment options selectable by the borrower may include a withdrawal entry in the Automated Clearing House network or a remote check creation process, so too can the deposit options available to the credit extension module 308. For example, the credit extension module 308 may initiate a deposit entry in the Automated Clearing House network to transfer funds' in an amount equal to the line of credit to the borrower. Alternatively, the credit extension module 308 may cause a credit card having a preset spending limit to be delivered to the borrower.

A collection module 309 is configured to execute recurring automatic withdrawals from the deposit account. For instance, during months where a balance is outstanding, the collection module 309 may execute an automatic withdrawal in accordance with the borrower's selected mode from the deposit account for an amount of principal and interest. By way of example, where the borrower selects electronic funds transfer as the recurring automatic withdrawal mode, the collection module 309 may initiate a withdrawal entry in the Automated Clearing House network to collect the necessary monthly repayment.

Turning now to FIG. 4, illustrated therein is one embodiment of extension of credit content 304 in accordance with the invention. The extension of credit content in FIG. 4 takes the form of a webpage viewable by a client terminal having a browser 306 in communication with the Internet or similar network. Such a webpage 304 is suitable for use by a lender who offers an extension of credit by delivering a credit card having a preset spending limit.

A prospective borrower accesses the webpage 304 by typing a URL 401 in the browser's URL window 402. The webpage 304 includes credit application content that a borrower may complete with a terminal keyboard. For example, the borrower may enter personal information 403, including name, address, phone number and e-mail address. The borrower may then enter financial information 404, including social security number, annual income, and method of receiving income.

As one embodiment of the invention includes an offer of credit contingent upon the lender being able to execute recurring automatic withdrawals from a deposit account, the borrower may give checking account information, including ABA routing number and checking account number, in section 405 of the webpage 406. A statement of the contingency details 406 may be provided to notify the borrower that the credit line will be declined without such electronic transfer access.

Optional modes for the automatic withdrawals, from which the borrower may select, may be provided. For example, mode 407 includes recurring automatic withdrawals by way of electronic fund transfer. Mode 408 includes recurring automatic withdrawals by way of remote check creation. The borrower may select one mode with a selection prompt 409.

Terms and conditions of the offer for credit may then be presented to the borrower at block 410. Once the terms and conditions are read and understood, the user may apply for the line of credit by clicking icon 411. Where the lender approves the completed application, the borrower will receive a credit card having a preset spending limit that may be used for purchases of goods and services. The lender will recover principal and interest payments by automatic withdrawals on a periodic basis.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention.

What is claimed is:

1. A method, operable with one or more processors to control the one or more processors to implement a process of providing credit, comprising:
providing an extension of credit application content with which an applicant may submit a request for credit, the extension of credit application comprising a plurality of repayment options, wherein at least one of the plurality of repayment options comprises at least a recurring withdrawal executed by electronic funds transfer and at least another of the plurality of repayment options comprises a recurring withdrawal executed by a remotely created paper negotiable instrument;
verifying an authorization to execute recurring withdrawals from a deposit account is received in conjunction with a completed extension of credit application;
extending a firm offer of credit contingent upon the verifying the authorization to execute recurring withdrawals from the deposit account is received, wherein the authorization comprises a selection from the plurality of repayment options, further comprising the steps of offering the withdrawal executed by electronic funds transfer at a first price and offering the withdrawal executed by the remotely created paper negotiable instrument at a second price, wherein the first price is less than the second price.

2. The method of claim 1, wherein the electronic funds transfer comprises a withdrawal entry in an automated clearing house network from the deposit account.

3. The method of claim 2, wherein the deposit account is held by a receiving depository financial institution.

4. The method of claim 3, wherein the withdrawal entry is executed by an originating depository financial institution.

5. The method of claim 1, wherein the remotely created paper negotiable instrument comprises a remote check creation.

6. The method of claim 1, further comprising the step of denying credit where the one-time authorization is not obtained.

7. The method of claim 1, wherein the deposit account is configured to receive direct deposit transactions.

8. The method of claim 1, wherein at least one of the plurality of repayment options comprises a conversion of a paper check at a point of sale into an electronic debit.

9. The method of claim 1, further comprising the step of extending additional credit upon obtaining the one-time authorization to execute recurring automatic withdrawals by electronic funds transfer.

10. A system for extending credit, the system comprising:
a. a network information server configured to deliver browser readable content to a client terminal having a browser in communication with an Internet, the network information server providing at least extension of credit application content to the browser with which an applicant may submit a request for a credit, wherein the extension of credit application content comprises a plurality of repayment options, wherein at least one of the plurality of repayment options comprises at least a recurring withdrawal executed by electronic funds transfer and at least another of the plurality of options comprises a recurring withdrawal executed by a remotely created paper negotiable instrument; b. a processing module operable with the network information server, the processing module being configured to verify that at least an authorization to execute recurring withdrawals from a deposit account is received in conjunction with a completed extension of credit application; and c. a credit extension module operable with the network information server, the credit extension module being configured to authorize an extension of credit only when the processing module verifies that the at least an authorization to execute recurring withdrawals from the deposit account is received; d. wherein the withdrawal executed by electronic funds transfer is presented at a first price and the withdrawal executed by the remotely created paper negotiable instrument is offered at a second price, wherein the first price is less than the second price.

11. The system of claim 10, wherein the withdrawal executed by remote electronic funds transfer comprises a withdrawal entry in an automated clearing house network.

12. The system of claim 11, wherein the deposit account is held by a receiving depository financial institution.

13. The system of claim 12, wherein the withdrawal entry is executed by an originating depository financial institution.

14. The system of claim 10, wherein the remotely created paper negotiable instrument comprises a remote check creation.

15. The system of claim 10, wherein the credit extension module is configured to deny credit wherein the processing module fails to verify the authorization to execute recurring withdrawals from the deposit account is received.

16. The system of claim 10, wherein the deposit account is configured to receive direct deposit transactions.

17. The system of claim 10, wherein at least one of the plurality of repayment options comprises a conversion of a paper check at a point of sale into an electronic debit.

18. The system of claim 10, wherein the credit extension module is further configured to extend additional credit upon obtaining the one-time authorization to execute recurring automatic withdrawals by electronic funds transfer.

* * * * *